(No Model.)
F. S. SMITH.
INCANDESCENT LAMP.
No. 484,825. Patented Oct. 25, 1892.
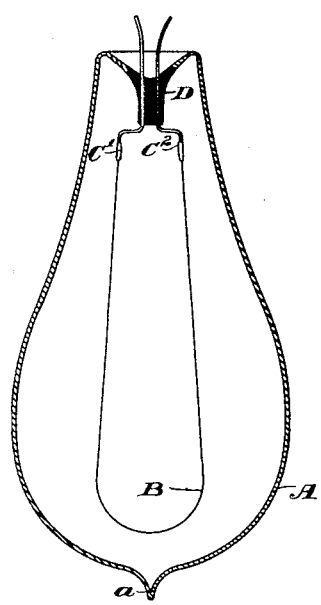
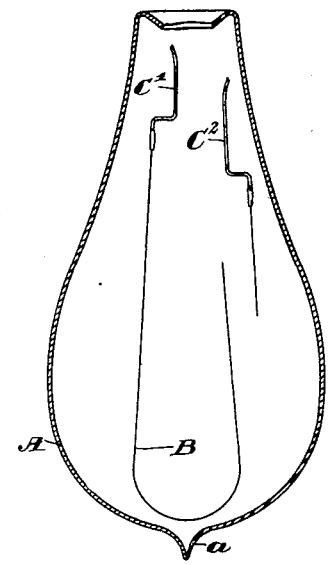
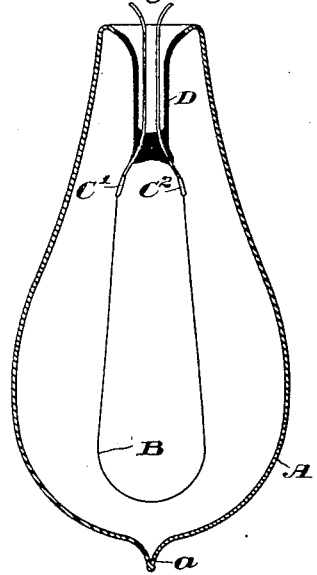
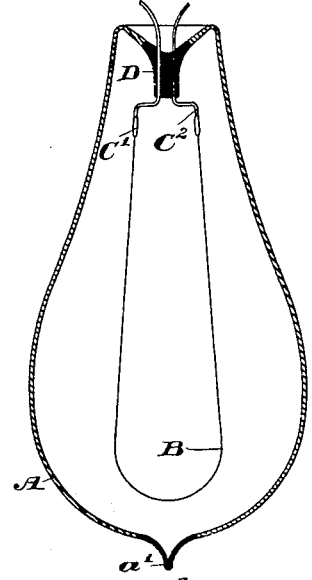
Witnesses
Inventor
Frank S. Smith.
By his Attorney

UNITED STATES PATENT OFFICE.

FRANK S. SMITH, OF PITTSBURG, PENNSYLVANIA.

INCANDESCENT LAMP.

SPECIFICATION forming part of Letters Patent No. 484,825, dated October 25, 1892.

Application filed February 29, 1892. Serial No. 423,272. (No model.)

*To all whom it may concern:*

Be it known that I, FRANK S. SMITH, a citizen of the United States, residing in Pittsburg, county of Allegheny, State of Pennsylvania, have invented a new and useful Improvement in Incandescent Electric Lamps, (Case No. 486,) of which the following is a specification.

The invention relates to the construction of incandescent electric lamps and to a method of separating the parts of the lamp after it has been used.

The object of the invention is to make an incandescent lamp of which the greater portion of the bulb and also the leading-in wires may be used repeatedly.

In general terms the invention may be stated to consist in constructing the inclosing chamber in two parts, the greater portion being of glass, while the remainder is composed of a soluble material which will unite with the glass portion and make an air-tight chamber, but which will dissolve out or separate from the glass portion when immersed in the proper solvent, leaving the glass portion intact.

I have found that certain compounds of the alkaline with the silicon group of elements may be used to form a portion of the lamp, preferably the supporting-stem—that is to say, the portion which carries the leading-in wires—which compounds are soluble in water, especially in hot water. These compounds also have certain physical characteristics which permit them to unite with the wires under the influence of heat, making air-tight joints, and they will also unite with the glass portion of the chamber. In this way there will be formed a composite inclosing chamber, a portion of which is of glass, while the remainder is of a soluble material. While it is usually advantageous that the portion surrounding or carrying the leading-in wires should be of the soluble material, other portions of the chamber may be made of soluble material. I have found that a soluble material composed of potash or soda, or both, mixed with silica or boron, or both, meets these requirements. I have, for example, used a silicate of soda corresponding approximately to the formula $2Na_2O.5SiO_2$ with success. I have also used various other combinations of the alkaline group of elements with the silicon group of elements, and I have found that there are several of them which work satisfactorily. The selection of the best compound in any given instance depends largely upon the composition of the glass portion of the globe. The greater the proportion of the alkali with reference to the silica the softer will be the resulting compound. The following compound, $4Na_2O.5SiO_2$, will make a perfect union with platinum leading-in wires and will also unite with a glass having a sufficiently-low fusing-point. I have also used the following formula, $Na_2O.4SiO_2$, and also various other compounds, and other compounds even beyond these limits may be used. As I have stated, the particular formula adopted should be largely controlled by the particular glass which it is desired to use for the glass portion of the lamp. In general it may be stated that with glasses of higher fusing-points the greater should be the ratio of the silica to the alkali.

The fact that boron is analogous in a great many ways to silicon in its chemical properties makes it under certain circumstances desirable to incorporate more or less boric acid, which has the formula $B_2O_3$.

The exact proportion of elements which it is desirable to use in different circumstances will vary, as already stated, with the particular glass to be used. These may be easily determined by simple experiments. I have found, for example, that soluble compounds of which the formulas were $2Na_2O.7SiO_2$ and $Na_2O.4SiO_2$ have both given good results when used in connection with bulbs made of the glass known as "Thill glass" or "soft" bulbs.

In the accompanying drawings, Figure 1 illustrates the glass portion of the chamber or what I have termed the "bulb" of the lamp. Fig. 2 illustrates the leading-in wires with a stem of soluble material. Fig. 3 illustrates the complete lamp. Fig. 4 illustrates the lamp after the soluble portion has been dissolved out. Fig. 5 illustrates a different form of lamp, and Fig. 6 illustrates a modification.

Referring to the figures, A represents the glass portion of the lamp or the lamp-bulb proper. B represents an incandescent filament, and $C'$ $C^2$ leading-in wires. These leading-in wires are mounted in a stem D of the soluble compound, such as hereinbefore described. The stem carrying the filament is then placed within the portion A and the stem is fused to the edges of the glass portion A. The chamber is then placed upon a pump and exhausted in the usual manner.

After the lamp has been in service and has become unfit for further use it may be immersed in a suitable solvent which will act upon the soluble portion D of the lamp—such, for instance, as hot water with or without the addition of alkalies or acids—and the soluble substance then gradually dissolves or disintegrates, thus removing the stem and freeing the leading-in wires. The latter may then be used again, and likewise the glass portion A. It may be advantageous in some instances to open the lamp before it is placed in the solvent, and this may be conveniently done by breaking off the teat $a$, or it may be opened in any other suitable manner. In other instances it may not be necessary to open the lamp before placing it in the solvent, as the pressure occasioned by the vacuum of the lamp may in some cases facilitate the solution of the portion D.

An important characteristic of this form of soluble compound and of a lamp constructed with such a soluble portion is that it permits of the use of iron leading-in wires.

In Fig. 5 I have illustrated a different form of stem than in Figs. 2, 3, and 4. In this instance the stem is tubular in form and extends upward into the chamber, the object being to expose a greater surface of the soluble portion to the action of the solvents.

Other portions of the lamp than the stem may be made of soluble material, if desired— as, for instance, the portion $a'$, as illustrated in Fig. 6.

The soluble portion may, if desired, be protected from the action of moisture in the air by coating it with a varnish or suitable protecting material which is impervious to moisture.

I claim as my invention—

1. An incandescent lamp consisting of a filament, leading-in wires and an inclosing chamber consisting in part of glass and in part of a soluble substance.

2. An incandescent lamp consisting of a filament and leading-in wires and an inclosing chamber composed of two sections, one consisting of glass and the other consisting of soluble compound surrounding the leading-in wires.

3. An incandescent lamp consisting of a filament and leading-in wires and an inclosing chamber consisting of two sections, one consisting of glass and the other consisting of a compound of one or more members of the alkaline group of elements with one or more members of the silicon group.

4. In an incandescent electric lamp, a soluble stem.

5. In an incandescent electric lamp, a chamber consisting in part of glass and in part of a soluble substance.

In testimony whereof I have hereunto subscribed my name this 25th day of February, A. D. 1892.

FRANK S. SMITH.

Witnesses:
W. W. SCOTT,
JAS. W. SMITH.